US008234167B2

(12) United States Patent
Civanlar et al.

(10) Patent No.: US 8,234,167 B2
(45) Date of Patent: Jul. 31, 2012

(54) VIDEO ADVERTISER-BROKER SUBSIDIZING VOIP CALLS

(75) Inventors: Seyhan Civanlar, San Francisco, CA (US); Bulent Kaytaz, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 943 days.

(21) Appl. No.: 11/716,297

(22) Filed: Mar. 9, 2007

(65) Prior Publication Data
US 2008/0221985 A1    Sep. 11, 2008

(51) Int. Cl.
*G06Q 30/00* (2006.01)
*G05B 19/418* (2006.01)

(52) U.S. Cl. ............... 705/14.64; 379/114.13; 709/223; 455/466

(58) Field of Classification Search ............ 705/14; 379/114.13; 709/223; 455/466
See application file for complete search history.

(56) References Cited

U.S. PATENT DOCUMENTS

| | | | | |
|---|---|---|---|---|
| 6,373,817 B1 * | 4/2002 | Kung et al. | | 370/217 |
| 6,493,437 B1 * | 12/2002 | Olshansky | | 379/114.13 |
| 6,603,844 B1 | 8/2003 | Chavez, Jr. et al. | | |
| 2002/0160793 A1 * | 10/2002 | Pradhan et al. | | 455/466 |
| 2007/0282989 A1 * | 12/2007 | Milstein et al. | | 709/223 |

OTHER PUBLICATIONS

UPSNAP, Inc. Edgar Online. Aug. 15, 2006.Journal Code: CXEO.*

* cited by examiner

*Primary Examiner* — John G. Weiss
*Assistant Examiner* — Victoria Vanderhorst
(74) *Attorney, Agent, or Firm* — IP Authority, LLC; Ramraj Soundararajan; Geoff Trotter (57) ABSTRACT

A system and method for an on-line web-based advertiser-broker to subsidize calls of a plurality of VOIP operators' subscribers by showing them video advertisements from a catalogue of advertisements provided by a plurality of advertisers. The advertisement is shown by the advertiser-broker and then the call is transferred to the VoIP operator for call completion.

The advertiser-broker provides the clearing-house services between many advertisers and many VoIP operators, subsidizing wholly or partially phone calls of users of VoIP operators by showing them streaming video advertisements of advertisers who pay for the calls. With this new business, phone calls get monetized through advertisers while users pay nothing for phone calls, and VoIP operators do not need to incorporate advertisers to their business.

25 Claims, 7 Drawing Sheets

VIDEO ADVERTISER-BROKER SUBSIDIZING VOIP CALLS

BACKGROUND OF THE INVENTION

1. Field of Invention

The present invention relates generally to the public Internet and more particularly, to a method and business model for subsidizing Voice-over-IP calls by using interactive video advertisements through a third-party advertiser-broker.

2. Discussion of Prior Art

Advertising has been a popular marketing tool for corporations. While many forms of advertising and different ad-channels exist, video advertising on television has been far more the popular and effective method compared to post-mail/email or magazine advertising, as the audience is captive and attentive. Most recently, with the advent of Broadband Internet access, and web and streaming technologies, on-line web-based video advertising started getting significant momentum. Particularly, in-banner and in-stream type of video and image-based advertising are used on web pages while users search for content or purchase goods on the Internet. Although video advertisement is available on the web, it is not as effective as television advertisement since the audience is not "captive" (i.e., the viewer may simply skip watching the video by closing the video window and proceeding with the task in hand).

In parallel with these advents, the telecommunications services started to move from traditional switch-based telephony networks to public Internet where black-phones are replaced by soft-phones capable of sending and receiving real-time multimedia streams instead of just voice during a call. Operators like Skype and Vonage have gained significant customer base by offering Voice-over-IP (VoIP) services at low or no cost.

Because of intense competition, there is a constant pressure to lower the cost of voice calls. As a consequence, the operators suffer from significant ARPU drops as they try to compete fiercely on price. The overwhelming growth in Skype's business has been attributed, among others, to "free-calling" phenomena. The "free-calling" model can only survive if another Party subsidizes for the calls.

Advertising through telecommunication channels is a virgin area. It offers to companies a direct marketing possibility. Different than the common traditional advertisement channels (newspapers, TV, radio, billboards, etc), telecommunication channels provide the added benefits of direct marketing advantage as the end-user can be classified in terms of age, gender, level of income, location, etc.

Taking advantage of these two evolutions, sponsoring call through advertisement will definitely open a new and controlled channel for advertisements. With the edging technologies, it is now also possible to push video based commercials to the end-users just as in TV advertisements.

SUMMARY OF THE INVENTION

Systems and methods consistent with the present invention address the need stated above by providing a mechanism through which the charges for VoIP telephone calls are reduced or completely eliminated through a third-party so called "advertiser-broker" who provides the service of subsidized calling by doing business with a plurality of sponsors, users and VoIP operators.

The new business method consistent with the present invention includes an advertiser-broker, a new type of online business on public Internet, who registers VoIP users of one or more VoIP operators so that the users can initiate a VoIP call from a special soft-phone provided by the advertiser-broker or by the operator such that a multimedia (audio, video, image and text) advertisement is displayed before the call, during ring-back-tone, during the call or after the call. In this model, advertiser-broker acts as a clearing-house between all subscribing sponsors and VoIP operators.

Insertion of ad or a message during a traditional phone call is well known and documented in prior art. For example, Chavez et al. describes in U.S. Pat. No. 6,603,844 a system in which an advertisement in the form of an audio message which is paid for by a third party is inserted during ring-back-tone in a telecommunication network. Insertion of advertisements into a VoIP stream is also prior art. For example, Olshansky describes in U.S. Pat. No. 6,492,437 a system where a VoIP service provider plays an advertisement during a call to generate a bill based on a subsidized billing rate. However, there is no prior art on a business method such as "advertiser-broker" in which the ad insertion is done by a third-party (not the telecommunications operator) servicing simultaneously many operators and many sponsors.

The advertisement selected for the user is determined through the profile of user (location, age, sex, education, profession, interest, etc.) in advertiser-broker user database. The sponsor subsidize for all or some calls (e.g., local calls only) of the VoIP user.

More generally, the ecosystem created by the new business model has the following players:

Sponsor: It is an advertising entity, which provides advertisements to sponsor end-users' calls, in return for direct advertising. Sponsors can be large corporations (e.g., Coca Cola), advertisement firms specialized in marketing and representing one of more large corporations, small or medium size merchants (e.g., local restaurants), institutions (e.g., schools or museums), etc. Sponsors provide the media and pay for the advertisement. Various pricing and payment methods can be implemented.

VoIP Operator: Voice over IP (VoIP) operator provides the telecommunications services for the end users. A VoIP operator is distinguished from a traditional operator who only provides voice services, by providing multimedia-calling capabilities and the use of public Internet as the transport network for multimedia sessions (aka calls). A VoIP operator can be an Internet based service provider using standard-based signaling such as Session Initiation Protocol (SIP) or another proprietary call signaling protocol, a mobile operator offering multimedia capabilities on handheld, a fixed operator using a VoIP infrastructure, an Internet Service Provider (ISP) or any other type of service provider which can enable a live multimedia session between two parties. The VoIP operator also represents the transport layer between the users and the sponsors. The VoIP operator opens up connections towards the advertiser-broker that hosts advertisements to provide free or subsidized calling services to its users by showing multimedia advertisements.

Advertiser-broker: The new entity, according to an aspect of this invention, building and managing the relationship between sponsors, operators and users within the context of playing advertisements and sponsorship. Advertiser-broker has connections to various VoIP operators to manage certain states of a call such as playing the advertisement at the beginning of the call and then handing over the call signaling to the VoIP operator. Alternatively, advertiser-broker only hosts advertisements, VoIP operator subscriptions, and user profiles, while VoIP operator who subscribe to services of advertiser-broker manage all states of the call including retrieving the advertisement from the advertiser-broker. In this scenario, playing the advertisement to a specific user at the beginning or during the call becomes the operator's technical task.

User: This is the individual that uses the subsidized calling service. The user is a subscriber of the VoIP operator and the subscriber of advertiser-broker. The user receives brief advertisements before or during their calls and gets a discount for that specific call or completely free calling.

The sponsor provides the media catalogue (video, audio, banners or text ads). They sign up to advertiser-broker by committing a subsidized volume of calls and corresponding dollars over a certain period of time. They may also provide the target audience profile for each ad in their catalogue, and the option of interacting with the ad (e.g., redirecting call to a call center, downloading a product brochure, sending an message with a URL in real-time). The advertisement catalogue is displayed on advertiser-broker portal for user to community's preview, rating and feedback. Advertiser-broker provides periodic call volumes and call detail records of all played advertisements to its sponsor. Each sponsor is provided access to the portal so that he/she can add/delete/edit their ads, add more features or simply view their ad ratings. This on-line mechanism enables even small merchant's to act as a sponsor by providing ads to a specific target local audience (by phone number or street address) and commit to a small budget for advertisements. The advertiser-broker receives ad videos from a plurality of sponsors, and doing so it acts as a single point of aggregation for all on-line in-call advertisement.

The advertiser-broker connects to a plurality of VoIP operators, acting as a clearinghouse, collecting advertisement dollars from the advertisers and paying them to VoIP operators for the users who get subsidized or free calling.

The advertiser-broker (or the VoIP operator depending on the model) providers a soft-phone its registered users to initiate phone calls. The soft-phone is a software application capable of showing a multimedia advertisement using audio and video codecs, and provide capabilities to show text and banners. The user can also initiate a phone call through a soft-phone. The soft phone provides TV-like multimedia capabilities to view recorded videos of sponsors. While making phone calls, users are provided with capabilities so that they can interact with the advertiser while viewing the ad, divert the call, ask for a reminder at the end of call, ask for an SMS to the mobile phone of the user. The soft-phone can be an embedded capability of a telephone (such as a mobile phone or a PDA), or it can be downloaded onto a PC or a handheld from a web site, or alternatively, it can be integrated to a web browser.

BRIEF DESCRIPTION OF THE DRAWINGS

The accompanying drawings, which are incorporated in and constitute a part of this specification, illustrate an embodiment of the invention and, together with the description, explain the invention.

In the drawings.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Systems and methods consistent with the present invention provides a new business model through which many VoIP operators simultaneously may enjoy offering telephone service that is completely or partially subsidized by video advertisers sharing the same advertiser-broker infrastructure. The VoIP operator provides telecommunications and Internet infrastructure to make multimedia calls. Usually, looking for advertisers and best advertisements for its users is outside the scope of usual business of an operator.

Figure 1:
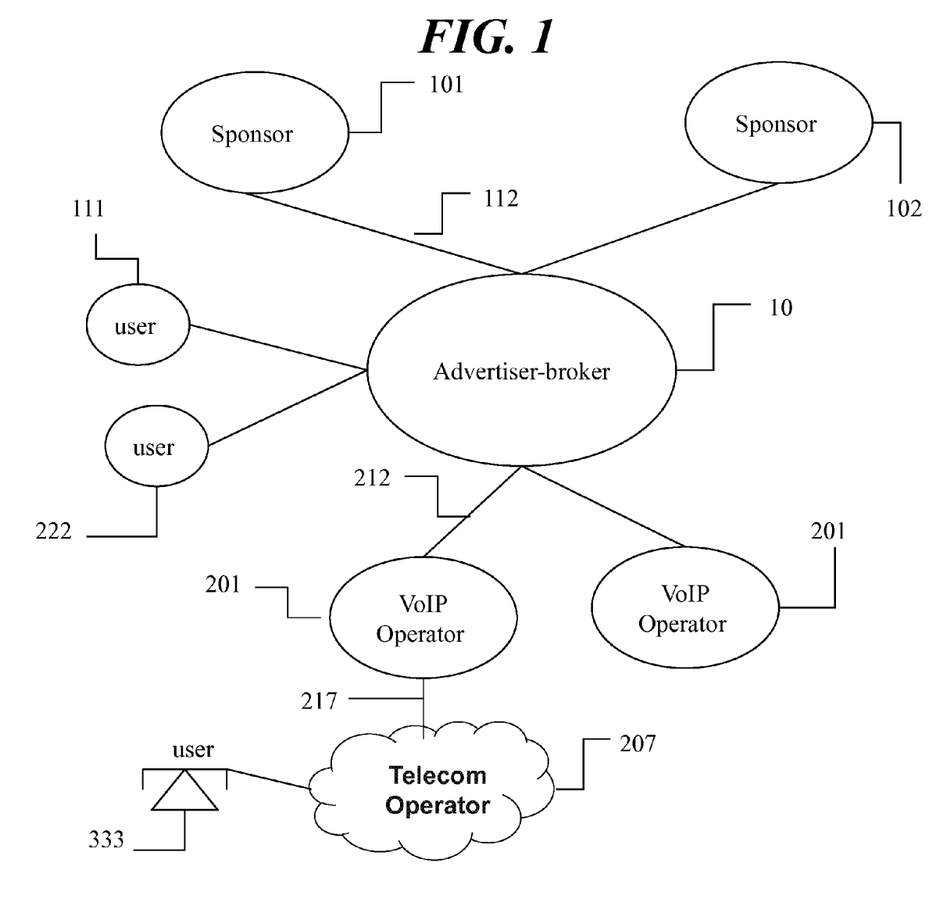
FIG. 1 illustrates an exemplary collection of advertisers and VoIP operators attached to the advertiser-broker to clarify the business interactions.

As illustrated in FIG. 1, advertiser-broker 10 connects to the network infrastructure of multiple VoIP operators 201 and 202, and multiple sponsors 101 and 102. The connectivity 212 between VoIP operator 201 and advertiser-broker 10 is an over-the-Internet connection using TCP/IP protocol or it's variants. Connection 212 may be running the Session Initiation Protocol (SIP) for call signaling, Real-Time-Protocol (RTP) for transport of call media. Alternatively, this connection may be running web-services over HTTP or other types of IP protocols to enable call signaling and media transport. Connection 212 may optionally support protocols such as RADIUS or DIAMETER so that the advertiser-broker can authenticate the user and verify the validity of user's subscription with the VoIP operator at the onset of a subsidized call by that user. All these protocols are well known in prior-art. The connection 112 between the sponsor and advertiser-broker may be HTTP protocol, File Transfer Protocol (FTP), database access protocol such as Light Directory Access Protocol (LDAP) or SQL, an Application Programming Interface (API) or a combination of these protocols and API or other Internet protocols. Users 111 and 222 are subscribers of VoIP Operators 201 and 202, respectively. User 333 is a telephone user attached to the traditional telecommunication network 207, which in turn connects to one or more VoIP operators through connection 217, which performs appropriate translations from IP protocols to traditional signaling and trunking protocols. User 111 and 222 register with advertiser-broker 10 as a user of VoIP operators 201 and 202 respectively, signing up for free (sponsored subsidized) service advertiser-broker offers. Advertiser-broker provides interactions between (1) user and sponsor; (2) sponsor and VoIP operator; and (3) user and VoIP operator, and clearing house functions for fund transfer from sponsor to VoIP operator.

Figure 2:
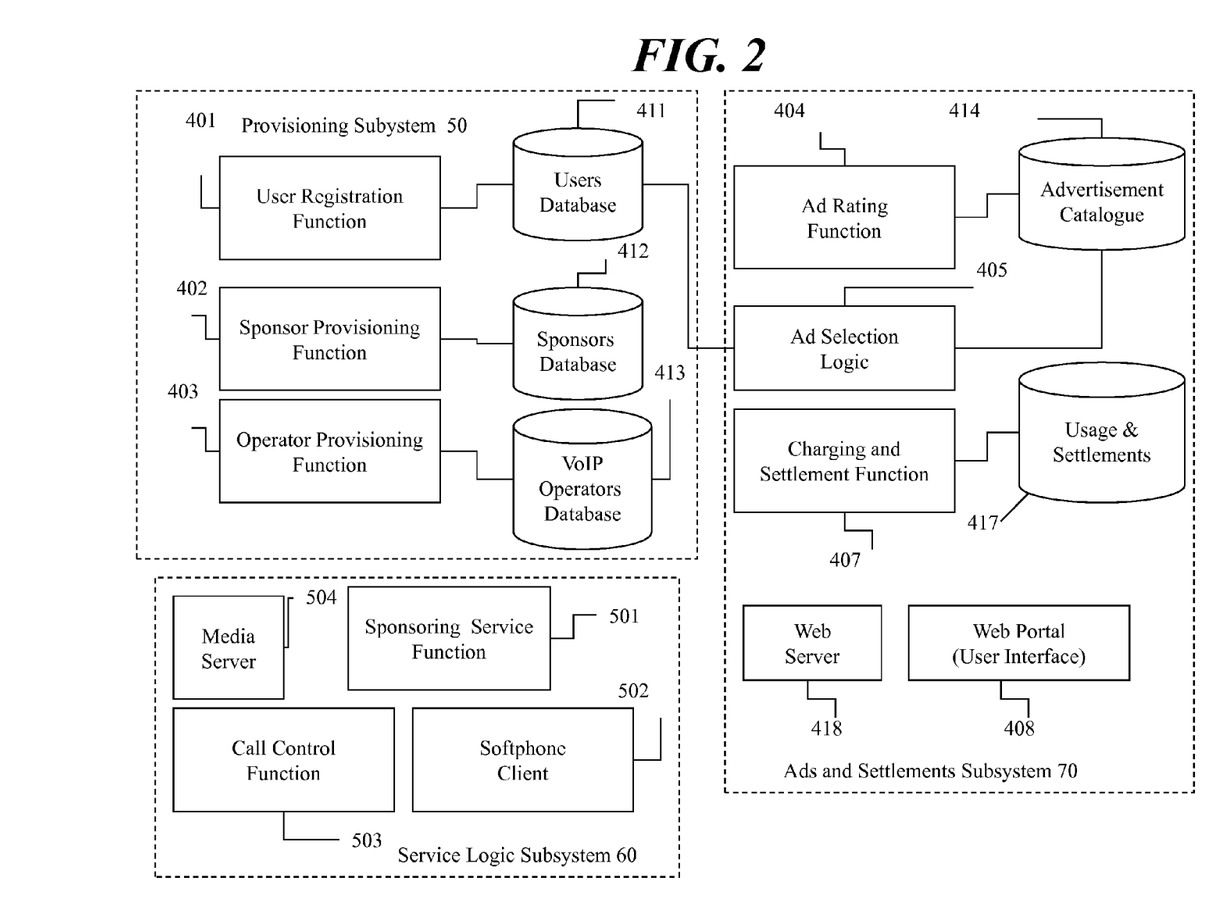
FIG. 2 illustrates an exemplary system component diagram of advertiser-broker.

The key functions of advertiser-broker 10 are illustrated in block diagram of FIG. 2 in three main subsystems:

Provisioning Subsystem 50: This subsystem has functions to register and provision operators, users and sponsors. User registration function 401 enables users to register with the service on-line entering user specific data such as name, address, profile, telephone number(s), VOIP operator(s), preferences and service subscription. All user specific information is then stored in user database 411.

Sponsor-Provisioning function 402 is another independent function, which enables a sponsor to perform self-provisioning. The sponsor provisioning steps include entering sponsor's name, address, telephone number, ad catalogue (videos, audios and banners) and ad's target audience profile, sponsor's access privileges, etc. Additionally sponsor includes the total funds committed to the system over a specific time period for sponsorship and the price he/she is willing to pay for each display of a particular ad. There may be other sponsor related functions that are provisioned into the system. Some of the steps during provisioning may also require human intervention (e.g., a call from a call center or a manual sales contracting step). Once a sponsor is provisioned, the sponsor related information is entered into sponsor database 412, while media of the sponsors ads and ad specific other information are stored in Advertisement Catalogue Database 414. From there on, the sponsor will have direct access to its content on advertiser-broker 10 via web portal 408, where view/edit/add/delete of media, or other type of modifications on media, or updates to sponsor related information can be done on-line.

Operator Provision Function 403 is another independent function, which enables a VoIP operator to perform self-provisioning. The provisioning steps include entering operator's name, address, telephone number, telephone number blocks, and user access privileges, etc. which are stored in VoIP Operator database 413. The operator transport layer connection may require a simple configuration step at TCP/IP layer (such as specifying the VoIP operator's gateway proxy server's IP address to call control function 503, or may require some integration at transport layer).

Ads and Settlements Subsystem 70: This is one of the vital components of advertiser-broker where all ads are managed and clearing-house functions are performed. Ad selection logic 405 provides the logic of dipping into the advertisement catalogue and user database to extract user profile to decide what ad to play when the user calls. This determination can be performed based on other input such as historic data of which ads are played to date, information about sponsor, operator and user preferences, and user response to particular types of ads. Ad selection logic 405 works in conjunction with sponsoring service function 501, which triggers the ad selection before or during the call. Ad rating function 404 enables users to provide reviews and ratings on ads they watched. These ratings get inserted to advertisement catalogue 414, and provided as feedback to sponsors.

Charging and settlement function 407 keeps track of all advertisement play records (or usage records) with all related data in DB 417: user id, telephone number, operator, time of call, sponsor, ad identifier, sponsoring cost, etc. so that information can be sorted, compiled and used to generate settlement information that goes to the VoIP operator in the form of revenues and to Sponsors in the form of costs. Such settlements can be performed online using standard eCommerce practices or using paper bills and receipts. Alternatively, accounting protocols such as RADIUS or DIAMETER may be used the transmit credit data to VoIP operators. The sponsors can also top-up their accounts on-line using Charging and Settlement function 407 on web-portal 408.

Figure 5:
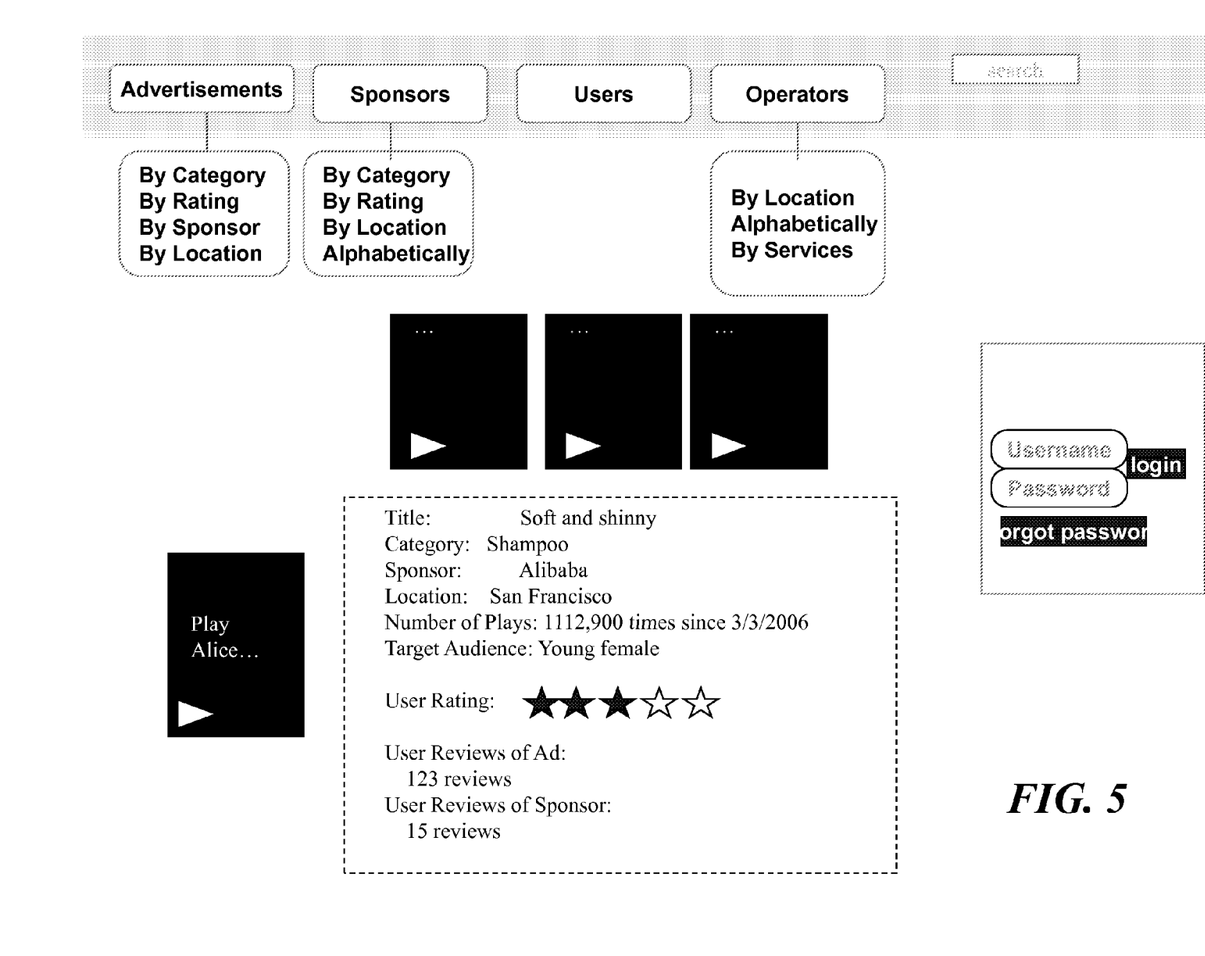
FIG. 5 illustrates an exemplary graphical user interface consistent with the present invention though which the advertiser-broker displays the advertisement catalogue.

An exemplary illustration of web portal 408's user interface is shown in FIG. 5 where skilled in art can see various functions provided for users, sponsors and operators. The username/password access provides functions defined for that particular type of audience. The ads and the information on each ad are available to public consumption. As a side benefits of showing the ads on web portal 408 to public, is other on-line advertisers may elect to use them through other on-line channels.

Service Logic Subsystem 60: Service Logic Subsystem 60 governs how advertisements are fed to the user over the public Internet. Media Server 504 is a type of streaming server known in prior art to send stored video to streaming clients (such a Microsoft and Real network media players) for viewing. It can be controlled through protocols such as SIP and Media Gateway Control Protocol (MGCP) defined by standard bodies. When a user starts a call, sponsoring service logic 501 first verifies the validity of subscription of user with its VoIP operator over Connection 212 using an authorization and authentication protocol VoIP operator supports. If the user is a valid user, it then interacts with ad selection logic 405 to determine which video to play to user, and sends a control signal to Media Server 504 to feed a particular video which in turn retrieves the video from database 414 and sends to user's client the video. Media server also supports video control functions from client such as fast forward, stop and resume.

Sponsor Service Function 501 is triggered when a user initiates a call and completes when the advertisement plays out or the called Party picks up the phone, depending on how the service is designed. When advertisement is completed, sponsoring service logic 501 triggers charging and settlement function 407 for generation of a record in the usage database 417. In parallel it also triggers the call control function 503 to perform regular call signaling towards the VoIP operator for call completion. While FIG. 2 defines a business model where the call control function 503 resides with the advertiser-broker 10. However, there may be other variant models defined in FIG. 3 and FIG. 4. Note that when the advertiser-broker keeps the call control function 503 in it's network, VoIP operator becomes merely a transport medium to carry the call. The signaling is handled entirely with advertiser broker from call start to call stop.

Figure 3:
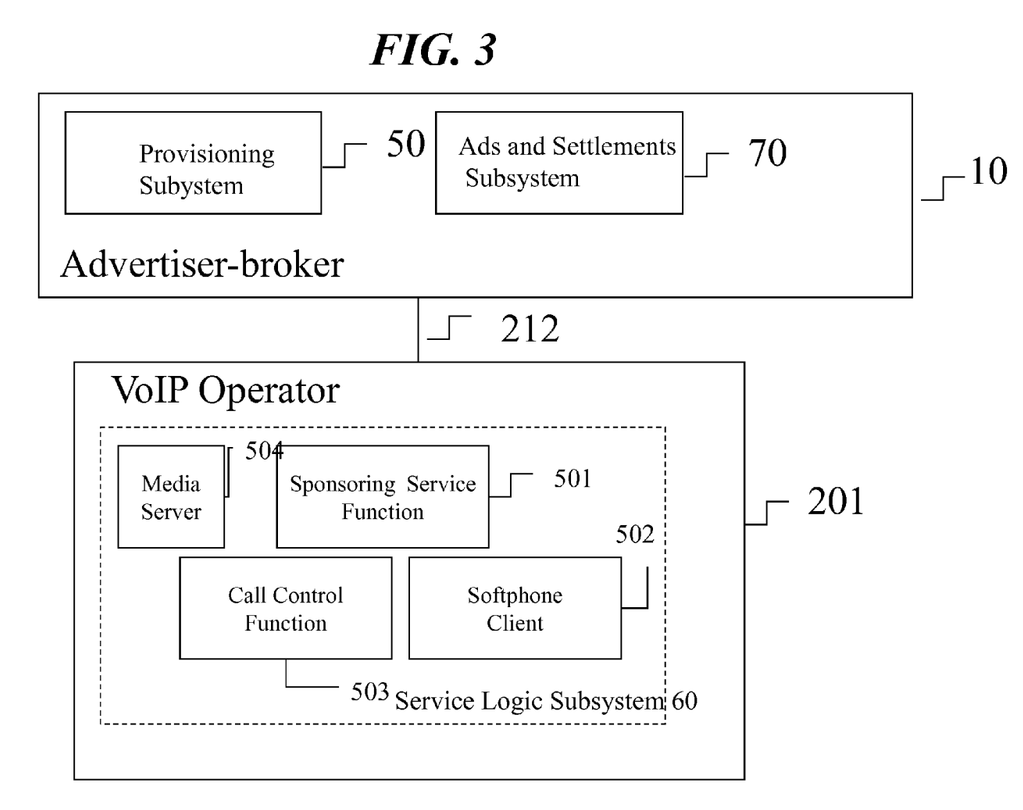
FIG. 3 illustrates an exemplary implementation of advertiser-broker.

The advertiser-broker of model shown in FIG. 3 provides provisioning subsystem 50 and ads and settlements subsystem 70 the same way as detailed above. The media-serving function is provided entirely by VoIP operator 201. In this model, the user originates a call using the VoIP operator's soft-client. The VoIP operator checks the advertiser-broker's user database 411 to determine if the user has a subscription to a free or subsidized call service. If the answer is affirmative, Sponsoring Service Logic 501 residing at VoIP operator's systems interact with Ad Selection Logic 405 of advertiser-broker to determine which video to play to user, and sends a control signal to Media Server 504 to feed a particular video which in turn retrieves the video from database 414 and sends to user's client the video. When advertisement is completed, sponsoring service logic 501 in the operator's network triggers charging and settlement function 407 in advertiser-broker for generation of a record in the usage database 417. In parallel it also triggers the call control function 503 to perform regular call signaling towards the VoIP operator for call completion. The key advantage of this configuration is that VoIP operator can insert an ad not only at the beginning of the call but during or even after the call since it handles call control and call signaling. In this model, the advertiser-broker is not responsible for playing the video only to provide the video.

Figure 4:
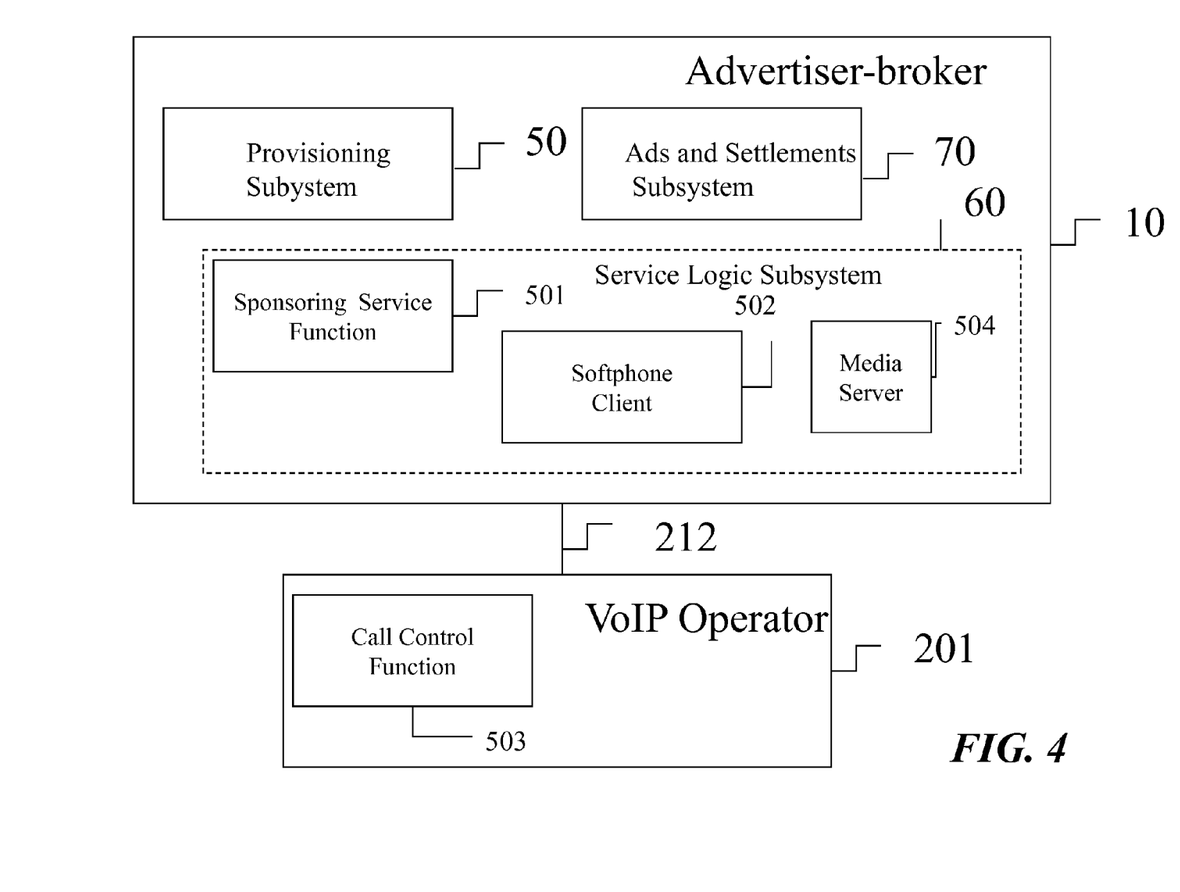
FIG. 4 illustrates another exemplary implementation of advertiser-broker.

The model of FIG. 4 works only when an ad is played at the beginning of the call (during or in place of ring-back-tone or prior to ring-back-tone) when the call signaling and call control has not commenced. Once the sponsored service function 501 verifies the that the user is a valid user of VoIP operator, and subsequently plays the ad, it then hands over the call to Call Control 503 of VoIP operator, it has no longer any control of the call.

Call signaling and call control are well known in prior-art. For example, SIP protocol (IETF RFC 3261) provides call signaling messages such as REGISTER, INVITE, 180 RINGING, 200 OK, BYE, etc. Call control entails the state-transition governed by a group of control decisions about the call during signaling. For example, call control is responsible for checking if the user properly registered after receiving a REGISTER message from a SIP client. Similarly, call control is responsible to send a dial tone or a busy signal during a RINGING, or terminate physical connections after a BYE.

Figure 6:
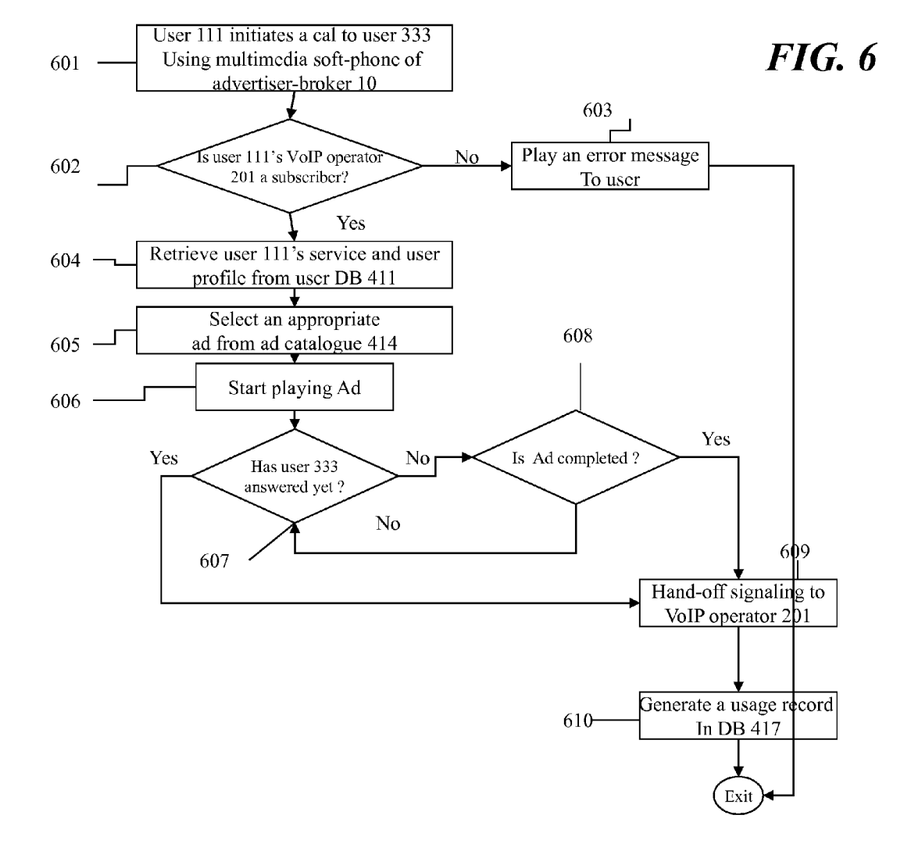
FIG. 6 illustrates a method for advertiser-broker playing the sponsor's ad to a user during ring-back-tone and then transferring the signaling to VoIP operator for the operator to connect the call.

FIG. 6 shows a simple business flow of playing an advertisement of a sponsor during ring-back-tone by the advertiser-broker. User 111 opens up her multimedia-capable client provided by advertiser-broker 10, and initiates a call to user 333's home phone number in step 601 using the client. Advertiser-broker 10 checks to determine (a) if user 111 is a registered user, (b) if the VoIP operator is still a subscriber; and (c) if the user is an authorized user of VoIP operator in step 602. If the answer is no, it plays an error message to the user and does not allow a subsidized call at step 603. Otherwise, it retrieves the user profile from the user database, and runs the ad selection logic to determine the ad of a sponsor to play at step 604 and 605, respectively. The ad starts on the multimedia client at step 606 while user 333 is ringing. The ad keeps playing until user 333's telephone continues to ring. If the ringing stops and the user answers in step 608, the ad is stopped. If the ad completes before the user 333 answers, then ringing continues, and call is handed over to VoIP operator 609 for further signaling and call control. At step 610, advertiser-broker 10 generates an ad usage record and inserts into its database.

Figure 7:
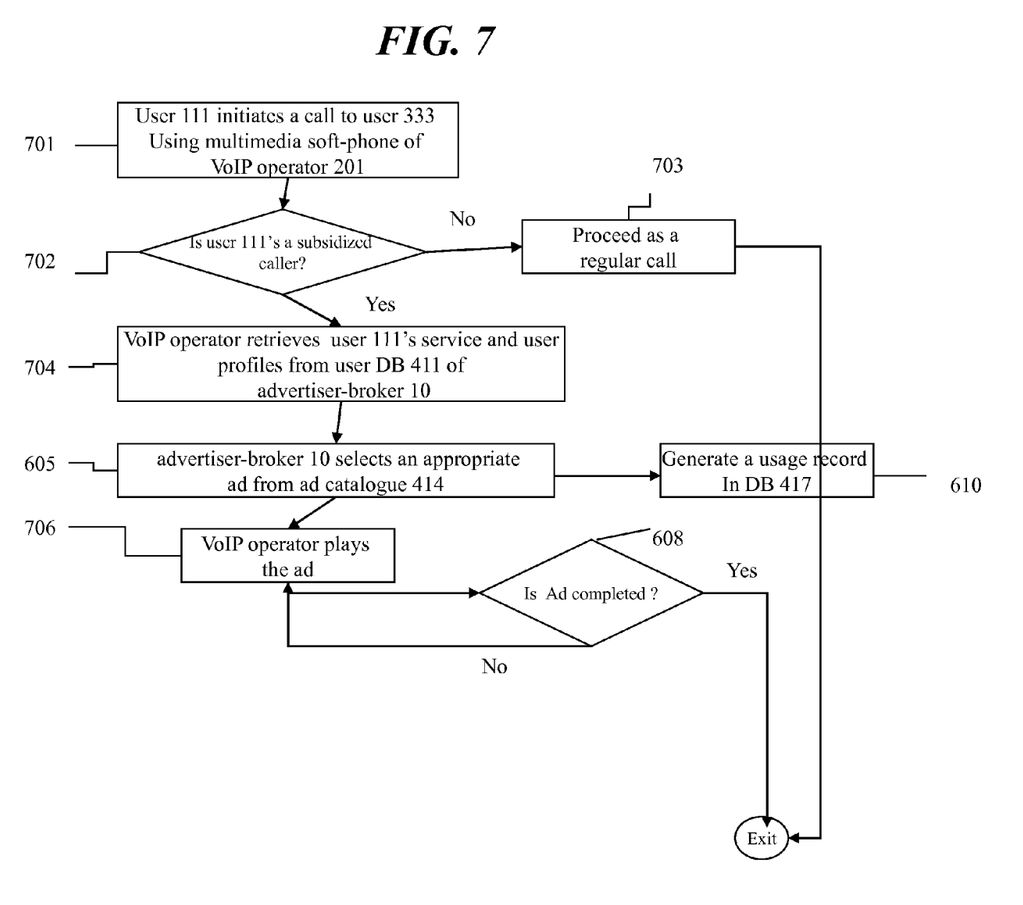
FIG. 7 illustrates another method of VoIP operator playing the sponsor's ad to a user using the multimedia ad catalogue of advertiser-broker and while call is in progress.

In FIG. 7 a slightly modified version of the flow is presented. In this scenario, the ad is played during the call by the VoIP operator, and not by advertiser-broker. User 111 opens up her multimedia-capable client provided by VoIP operator 201, and initiates a call to user 333's home phone number in step 701 using the client. VoIP operator 201 checks to determine if user 111 is a registered user of advertiser-broker 10 eligible for a subsidized call in step 702. If the answer is no, it continues with the normal call flow in step 703. Otherwise, VoIP operator 201 requests the advertiser-broker to retrieve the user profile from the user database and run the ad selection logic to determine which ad of a sponsor to play at step 605. The ad starts on the multimedia client at step 706 e during the call (during ring-back, during the call or end of call). The ad keeps playing until it is completed. At step 610, advertiser-broker 10 generates an ad usage record and inserts into its database.

CONCLUSIONS

Systems and methods consistent with the present invention provide a new method by which consumers may make completely free telephone calls though a third-party advertiser-broker who simultaneously services a plurality of sponsors, operators and users providing a new revolutionary model to monetize calls so that while advertisers find a new venue to get their message across, users get free calls.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a subsidized telephone system and method are described above, it will be appreciated that the system and method of the present invention would apply equally well to other forms of communications and different implementations of the business methods.

The following claims and their equivalents define the scope of the invention.

The invention claimed is:

1. A system comprising:
   a computer readable medium containing executable program code encoded thereon to implement an advertising broker, said advertising broker acting as a third party clearing house simultaneously serving at least one advertisement sponsor, a plurality of VoIP service provider networks, and a plurality of subscribers, said advertising broker comprising a provisioning subsystem, an advertisement and settlement system, and a service logic subsystem,
      said provisioning subsystem registering and provisioning a plurality of VoIP service provider networks, subscribers, and at least one advertisement sponsor;
      said advertisement and settlement subsystem extracting a profile associated with subscriber(s) to determining what advertisements are to be rendered and generating settlement information, after advertisements are rendered, by determining a cost to be charged to sponsor(s) and a revenue to be credited to VoIP service provider network(s);
      said service logic subsystem defining how advertisements are rendered over the Internet;
      the program code instructing a processor to perform the following:
   i. provisioning said plurality of VoIP service provider networks for communication with said advertisement broker over the Internet, each VoIP service provider network providing multimedia calling capabilities over the Internet;
   ii. receiving, from a subscriber, a request for providing a multimedia communication with a called party;
   iii. picking at least one advertisement sponsor from one or more advertisement sponsors, with said at least one advertisement sponsor providing one or more advertisements;
   iv. selecting at least one advertisement from said one or more advertisements;
   v. identifying a VoIP service provider network among said plurality of VoIP service provider networks for providing said multimedia communication;
   vi. providing said multimedia communication with said called party at a flee or subsidized cost to said subscriber via said identified VoIP service provider network in exchange for rendering said selected at least one advertisement, said selected at least one advertisement inserted by said advertising broker.

2. The system of claim 1, wherein said identified at least one advertisement is rendered prior to commencement of said multimedia communication.

3. The system of claim 2, wherein said identified at least one advertisement is rendered during ring back tone, and upon completion of said identified at least one advertisement, transferring said multimedia communication to said identified VoIP service provider network for connecting to said called party.

4. The system of claim 2, wherein said identified at least one advertisement is rendered during ring back tone, and upon a called party going off-hook, transferring said multimedia communication to said identified VoIP service provider network for connecting to said called party.

5. The system of claim 1, wherein said identified at least one advertisement is rendered while said multimedia communication is in progress.

6. The system of claim 1, wherein said identified at least one advertisement is rendered after said multimedia communication is complete with said called party.

7. The system of claim 1, wherein said subscriber communicates with said advertisement-broker via a client provided by said advertisement broker.

8. The system of claim 1, wherein said subscriber communicates with said advertisement-broker via a client provided by one of said VoIP service provider networks.

9. The system of claim 1, wherein communications between said advertisement broker and said subscriber are via the Session Initiated Protocol (SIP).

10. The system of claim 1, wherein said multimedia communication comprises combinations of the following: audio, video, image or text.

11. The system of claim 1, wherein said at least one advertisement is identified based on a profile associated with said subscriber.

12. The system of claim 1, wherein said subscriber is a subscriber of at least one of said plurality of VoIP service provider networks.

13. The system of claim 1, wherein said subscriber registers with one of said plurality of VoIP service provider networks to initiate said multimedia communication.

14. A method implemented by a computer, said computer executing a program stored in a computer readable medium, where the program instructs the computer to perform the following steps:
 a. provisioning a plurality of VoIP service provider networks, a plurality of subscribers, and at least one advertisement sponsor for communication with said advertisement broker over the Internet, each VoIP service provider network providing multimedia calling capabilities over the Internet;
 b. receiving, from a subscriber, a request for providing a multimedia communication with a called party;
 c. picking at least one advertisement sponsor from one or more advertisement sponsors based on a profile associated with said subscriber, with said at least one advertisement sponsor providing one or more advertisements;
 d. selecting at least one advertisement from one or more advertisements associated with one or more advertisement sponsors;
 e. identifying a VoIP service provider network among a plurality of VoIP service provider networks for providing said multimedia communication;
 f. providing said requested multimedia communication with said called party at a free or subsidized cost to said subscriber via said identified VoIP service provider network in exchange for rendering said selected at least one advertisement, said rendered at least one advertisement inserted by an advertising broker acting as a third party clearing house simultaneously serving at least one advertisement sponsor, a plurality of VoIP service provider networks, and a plurality of subscribers, and not inserted by any of said VoIP service provider networks; and
 g. generating settlement information by determining a cost to be charged to sponsor(s) associated with said rendered at least one advertisement and a revenue to be credited to identified VoIP service provider.

15. The method of claim 14, wherein said identified at least one advertisement is rendered prior to commencement of said multimedia communication.

16. The method of claim 15, wherein said identified at least one advertisement is rendered during ring back tone, and upon completion of said identified at least one advertisement, transferring said multimedia communication to said identified VoIP service provider network for connecting to said called party.

17. The method of claim 15, wherein said identified at least one advertisement is rendered during ring back tone, and upon a called party going off-hook, transferring said multimedia communication to said identified VoIP service provider network for connecting to said called party.

18. The method of claim 15, wherein said identified at least one advertisement is rendered while said multimedia communication is in progress.

19. The method of claim 14, wherein said identified at least one advertisement is rendered after said multimedia communication is complete with said called party.

20. The method of claim 14, wherein said subscriber communicates with said advertisement-broker via a client provided by said advertisement broker.

21. The method of claim 14, wherein said subscriber communicates with said advertisement-broker via a client provided by one of said VoIP service provider networks.

22. The method of claim 14, wherein communications between said advertisement broker and said subscriber are via the Session Initiated Protocol (SIP).

23. The method of claim 14, wherein said multimedia communication comprises combinations of the following: audio, video, image or text.

24. The method of claim 14, wherein said at least one advertisement is identified based on a profile associated with said subscriber.

25. An article of manufacture having a computer readable storage medium with an executable program encoded thereon, where the program instructs a microprocessor to perform the following steps:
 a. provisioning a plurality of VoIP service provider networks, a plurality of subscribers, and at least one advertisement sponsor for communication with said advertisement broker over the Internet, each VoIP service provider network providing multimedia calling capabilities over the Internet;
 b. receiving, from a subscriber, a request for providing a multimedia communication with a called party;
 c. picking at least one advertisement sponsor from one or more advertisement sponsors based on a profile associated with said subscriber, with said at least one advertisement sponsor providing one or more advertisements;
 d. selecting at least one advertisement from one or more advertisements associated with one or more advertisement sponsors;

e. identifying a VoIP service provider network among a plurality of VoIP service provider networks for providing said multimedia communication;
f. providing said requested multimedia communication with said called party at a free or subsidized cost to said subscriber via said identified VoIP service provider network in exchange for rendering said selected at least one advertisement, said rendered at least one advertisement inserted by an advertising broker acting as a third party clearing house simultaneously serving at least one advertisement sponsor, a plurality of VoIP service provider networks, and a plurality of subscribers, and not inserted by any of said VoIP service provider networks; and
g. generating settlement information by determining a cost to be charged to sponsor(s) associated with said rendered at least one advertisement and a revenue to be credited to identified VoIP service provider.

* * * * *

UNITED STATES PATENT AND TRADEMARK OFFICE
CERTIFICATE OF CORRECTION

| | |
|---|---|
| PATENT NO. | : 8,234,167 B2 |
| APPLICATION NO. | : 11/716297 |
| DATED | : July 31, 2012 |
| INVENTOR(S) | : Seyhan Civanlar et al. |

It is certified that error appears in the above-identified patent and that said Letters Patent is hereby corrected as shown below:

COL 8, LINE 63, delete "flee" and insert therefore --free--.

Signed and Sealed this
Fourth Day of December, 2012

David J. Kappos
*Director of the United States Patent and Trademark Office*